United States Patent [19]

Porter et al.

[11] Patent Number: 4,935,192

[45] Date of Patent: Jun. 19, 1990

[54] METHOD FOR TREATING FISH MEAT CONTAMINATED WITH SPOROZOA AND POTATO PRODUCT FOR IMPROVING HEAT GELATION OF FISH MUSCLE

[75] Inventors: Roy W. Porter, Brier; Barbara J. Koury; George Kudo, both of Seattle, all of Wash.

[73] Assignee: The United States of America as represented by the Secretary of Commerce, Washington, D.C.

[21] Appl. No.: 272,274

[22] Filed: Nov. 17, 1988

[51] Int. Cl.$^5$ .................................................. A23B 4/00
[52] U.S. Cl. ...................................... 426/56; 426/332; 426/637; 426/643
[58] Field of Search ............... 426/637, 49, 56, 59, 426/473, 384, 634, 332, 643

[56] References Cited

U.S. PATENT DOCUMENTS

| | | | |
|---|---|---|---|
| 91,554 | 6/1869 | Marshall | 426/473 |
| 3,615,724 | 6/1969 | Sech | 426/473 |
| 4,207,354 | 6/1980 | Haga | 426/574 |
| 4,241,094 | 12/1980 | O'Neil | 426/637 |
| 4,284,653 | 8/1981 | Shigeoka | 426/312 |

FOREIGN PATENT DOCUMENTS

| | | | |
|---|---|---|---|
| 62-130375 | 7/1985 | Japan | 426/56 |
| 62-36165 | 2/1987 | Japan | 426/56 |
| 610510 | 6/1978 | U.S.S.R. | 426/637 |

OTHER PUBLICATIONS

Tsuyuka 1982 Fisheries and Aquatic Sciences Canadian Technical Report No. 1130.
Niki, 1984 Bulletin of Japanese Society of Scientific Fisheries 50(12) 2043.
Konagaya, 1981 Bull. Tokai Reg. Fish Res Lab 105, Oct. 1–16.
Nagahisa, 1983 Bulletin of Japanese Society of Scientific Fisheries 46(6) 901 with English translation.

*Primary Examiner*—Carolyn Paden
*Attorney, Agent, or Firm*—Thomas Zack; Alvin J. Englert; Joseph DeBenedictis

[57] ABSTRACT

The present invention describes a method of treating fish meat which becomes softened due to contamination with sporozoa parasites. The method involves mixing salt and an improved freeze-dried water extract of potato or a freeze-dried raw potato powder with the contaminated fish meat paste. A particular extraction process is described which results in an improved color characteristic of the finished product. Also, a method of obtaining a freeze-dried raw potato powder which has an improved color characteristic, is described. The invention also pertains to the use of the powder in treating meat from uncontaminated fish to improve the gelation characteristic thereof.

53 Claims, No Drawings

METHOD FOR TREATING FISH MEAT CONTAMINATED WITH SPOROZOA AND POTATO PRODUCT FOR IMPROVING HEAT GELATION OF FISH MUSCLE

BACKGROUND OF THE INVENTION

1. Field of the Invention

The present invention relates to a novel method and additive as well as a method for making the additive which is useful for improving the gelation property of fish meat. More particularly, the present invention is concerned with improving the gelation of fish meat paste products in instances where the fish meat is obtained from fish which are contaminated with certain types of sporozoa. Fish meat which is contaminated or infected with these sporozoa parasites have a propensity for becoming soft and the softened condition prevents the gelation of certain fish meat paste products in which gelation is a highly desirable feature. The invention is also concerned with improving the gelation of fish meat which is obtained from certain species of fish which are not contaminated with the sporozoa but which become soft when processed into fish meat paste products but to a lesser degree than those contaminated with sporozoa.

2. Background Information and Description of Related Art

The muscle tissue of several species of fish are infected with myxosporea parasites. It is known that the proteolytic enzyme activity associated with these parasites causes the fish which are contaminated with these parasites to develop the so-called "softened condition" in which the fish meat is spottily or wholly softened and/or liquefied. This softened condition interferes with the processing of the fish meat into certain paste-like products wherein the formation of a firm gel having adequate elasticity is highly desirable. These paste products include surimi, neriseihin, kamaboko and related products such as those described in U.S. Pat. Nos. 4,284,653 and 4,207,354; the specifications of which are incorporated herein by reference.

In making the fish meat paste products, a kneaded meat is prepared from the fish muscle. When the kneaded meat is prepared from fish meat having the tendency to become soft, the kneaded meat exhibits no gel-forming capability or a greatly reduced gel-forming capability and thereby remains in a non-gelled soft condition after heating.

It has been noted that because of the proteolytic enzyme(s) activity associated with these parasites, some softness or lack of texture can occur during storage of contaminated fish under un-iced or even iced conditions prior to freezing. In addition, it has been noted by Tsuyuki et al. in the *Fisheries and Aquatic Sciences*, Canadian Technical Report #1130 (1982) that the texture can be completely lost during slow heating since the enzyme(s) have been known to be active over a rather wide temperature range (20°–75° C.). Since these temperature ranges must be traversed during normal heating and cooking of such infected fish, mushiness can occur and the fish is unacceptable for normal consumer uses.

Pacific whiting, *Merluccius productus*, is one of the species commonly infected with myxosporea. The parasite problem has lead to low economic value and the lack of utilization of this abundant resource. Due to the difficulty in spotting infected versus non-infected fish or fillets, it is not practical to try to segregate and discard infected fish. Also, the level of infestation varies and so does the degree of softening between various lots of fish. Therefore, one can see that producing a consistent product from the muscle of Pacific whiting is difficult without some means of providing insurance against this degradation. Several workers have suggested that rapid heating during cooking might provide a solution by quickly exceeding the active temperature range and destroying the enzyme before it can act. However, this has not proven to be a practical solution.

Because the myxosporea parasites *Kudoa thyrisitis* and *Kudoa paniformis* are intra-muscular in their distribution, it is believed that a salt solubilization step is required to gain access to the enzyme. This was demonstrated by Niki et al. in the *Bull. Jap. Soc. of Sci. Fish.*; Vol. 50; pp 2043-2047 (1984). Niki attempted to remove the proteolytic enzyme(s) from Peruvian whiting (also infected by the same myxosporea parasite as Pacific whiting) by water washing. Continual washing of minced flesh of Peruvian hake did not result in removal of the enzyme(s), as shown by the lack of gelling properties of kamboko made from the water-washed muscle. However, the addition of salt following the last wash (more than 0.45 M NaCl) followed by a period of mixing and subsequent dilution with water, allowed the myofibrillar proteins to settle out of solution while the enzyme remained in solution. Recovery of these myofibrillar proteins by separating them from the water (which now contained the enzyme released by the salt solubilizing step) provided a functional protein which made a kamaboko of respectable gel-strength and elasticity. This demonstrated that a salt solubilizing step was needed somewhere in the process to gain access to the enzyme within the muscle fibers. Earlier workers (Konagaya and Oaki, *Bull. Tokai Reg. Fish. Res. Lab.* No. 105, October, 1981) had concluded that the enzyme(s) was derived from the parasite and was in the muscle fibers of infected Pacific whiting.

The functional properties of surimi are derived after salt solubilizing the proteins by kneading the surimi with salt. Flavorings, starches, and other ingredients are added, the product is formed or shaped, and then heat set into a gel. Addition of a specific inhibitor at the time one solubilizes the surimi by mixing with salt should provide an effective deterrent to protease enzyme degradation upon heating. Alternatively the inhibitor can be added at the time cryoprotectants are mixed with the refined mince to make surimi prior to freezing of surimi.

Several researchers have demonstrated that the enzyme(s) responsible for softening muscle in Pacific whiting is of the thiol type.

Haga et al. (1984) in U.S. Pat. No. 4,207,354 describes the addition of egg white to myxosporea-contaminated fish meat to allow it to be processed into a coagulated fish paste. Essentially they added egg white which contains proteolytic enzyme inhibitors at either the surimi making stage or at the kamaboko making stage which allowed them to produced a coagulated fish paste. These authors concluded that the addition of 3% egg white to Pacific whiting surimi made a very satisfactory kamaboko. However, 0.5–6.0% dried egg white is a very expensive ingredient and at higher levels imparts a definite undesirable egg-like odor to the final product.

Nagahisa et al. (*Bull. Jap. Soc. Sci. Fish.*, 49(6); 901-906; 1983) blended flesh prepared from frozen Pacific whiting with Alaska pollock surimi and compared several additives with respect to their effect on gel-strength. Among the additives tested was a freeze-dried water extract of potato which had some effectiveness when added at the 1% level. Nagahisa et al. reported they used 1% of a freeze-dried water extract of potato and achieved moderate results for inhibition of the enzyme and preservation of gel-strength in a mixture of Pacific whiting meat and Alaska pollock surimi. However, these authors neglected to say that you cannot make a water extract from raw potatoes (*Solanum tuberosum*) and freeze dry this material without the product turning nearly black or dark purple in color. This imparts an objectionable dark gray color to the kamaboko even when added to surimi at low levels of 1% or even less. This approach is unsatisfactory since all the soluble components of the potato are very reactive and quickly discolor prior to freezing and freeze-drying.

In addition to fish which are contaminated with myxosporea parasites, it has been observed that meat of certain species of fish have a lower gel-strength in many cases without exhibiting a soft condition even though causative parasites are absent. For example, the meat of Alaska pollock in some cases is known to vary in gel-strength when made into kamaboko type products, yet these fish are not infected with myxosporea parasites. Thus, the cause of this is unrelated to the parasitic induced softening observed with respect to myxospora contaminated fish. Therefore, a need still exists in the art to treat uninfected fish to improve the gel characteristics of the meat products made therefrom. It would also be highly desirable to improve upon the methods and compositions used to treat myxosporea infected fish to avoid the development of the softened condition and to improve the gel quality of the fish paste product made therefrom.

SUMMARY OF THE INVENTION

The present invention solves the problems of the prior art by providing an improved water extract of potato, especially a freeze dried extract, as well as a potato product made from whole raw potatoes. The potato product may be raw ground potatoes or it may be dried raw potato powder made from raw potatoes. Preferably the raw potato product is freeze dried raw potato powder. The present invention also provides a method of treating contaminated and uncontaminated fish with either the improved water extract of the potato or with the potato product. Treatment of the fish meat with these products by adding the products to the fish meat during the salt solubilization step results in an improvement of the gel-forming capability of the fish paste products made from the meat of fish which are contaminated with myxosporea as well as fish which is not contaminated with myxosporea but which, nonetheless, does not develop an adequate gel strength. The extract or the potato product may be added at the surimi or the kamaboko stage.

It has also been discovered in accordance with this invention that the use of the freeze-dried raw potato powder results in an unexpected improvement in improving the gel-forming capability of uncontaminated fish over the use of the freeze-dried potato extract.

It is an object of this invention to provide an improved water extract of potato, particularly in a dried form, as well as a raw potato product especially a freeze-dried raw potato powder for improving the gel-forming ability of myxosporea contaminated fish meat while avoiding the problems associated with prior art additives used for the same purpose.

It is a further object of this invention to enhance the gel-forming ability of fish meat over the amount obtainable with prior art additives.

It is a further object of this invention to provide an improved water extract of potato as well as a raw potato product obtained from whole raw potatoes, for improving the gel-forming ability of fish meat which shows lower gel-strength even though the meat is not contaminated with the myxosporea parasite.

It is a further object to prepare an improved potato extract and freeze-dried raw potato powder which has an improved color characteristic.

It is still a further object of this invention to produce a natural food product inhibitor for the thiol protease enzyme associated with the myxosporea parasite which is economical and which requires little or no change in the traditional processing of surimi from infected whiting compared to Alaska pollock and to provide a surimi of sufficient functional quality to be utilized in most of the product forms currently utilizing pollock surimi.

These and other objects of the invention will become apparent to those skilled in the art from the following disclosure. The objects of the present invention are achieved through the discovery that a particular extraction process results in an improved potato extract which offers beneficial results in fish meat processing heretofore not obtainable with other types of potato extracts. The improved extract is used to treat meat from infected fish as well as the meat from those species of fish which are not contaminated but which do not develop adequate gel strength. Additional objects are also achieved by treating the meat of infected and non-infected fish with a raw potato product which is made from whole, raw potatoes. The treatment involves the addition of the extract or the raw potato product to the fish and grinding or kneading the fish in the presence of salt so that the salt will release the enzyme of the contaminated fish and the inhibitor will gain access to the enzyme. The extract or the raw potato product may be added at the surimi stage.

The amount, timing and method of adding and mixing the extract or potato product to uncontaminated fish is identical to the treatment of contaminated fish even though the uncontaminated fish does not contain the myxosporea produced protease enzyme.

In accordance with this invention, a white or non-darkened extract of potato is prepared and this extract has extreme effectiveness in preventing the formation of the softened condition in infected fish such as infected Pacific whiting and in non-infected fish such as Alaska pollock. The process uses specific extraction steps which involves specific pH limitations and specific reagents to result in the improved extract. The process requires decreasing the pH to 4.3 or less during the extraction and treatment with a strong reducing agent such as sodium dithionite or another reducing agent such as sulfite, bisulfite, $SO_2$ or L-cysteine. More specifically, the potatoes are first peeled and, if necessary, they are diced so that they can be placed in a blender to make a slurry. While the potatoes are being peeled and diced, they should be immersed in the dithionite solution until the complete batch of potatoes is peeled and diced. Next the dithionite solution is decanted off and the potatoes are ground with a small amount of the dithionite solution to make a slurry. The slurry is pressed to make obtain a liquid extract which is recovered from the pulp. The extract is acidified to a pH of 4.3 or less to form a precipitate. The precipitate is removed and discarded and the supernatant is brought to 70% $(NH_4)_2SO_4$ by the addition of solid $(NH_4)_2SO_4$ to form a precipitate. The precipitate is separated from the supernatant and recovered, dissolved in distilled water and then dialyzed against distilled water using 1000 molecular weight cut-off dialysis membrane. The product obtained from the dialysis is then frozen and freeze-dried.

It has also been discovered that a variety of potatoes known as "Norgold" such as those grown in Eastern Washington State are unexpectedly superior in the inhibitor content compared to Russet Burbank and several other varieties tested. It has also been discovered that the inhibitor content is highest near the time of harvest (typically August—September in Washington state) and appears to decrease upon holding in commercial potato storage. Therefore, the extract and the freeze-dried raw potato powder is most advantageously made from Norgold potatoes which are processed near the time of harvest without storing the potatoes.

It has also been discovered that the inhibitor found in the extract and in the raw potato product is heat labile and loses its activity after cooking of the potato. Therefore, currently available dried potato products as well as extracts made therefrom are unusable as a source of inhibitor. However, dried raw potato is an excellent source of inhibitor if dried under mild conditions and subsequently ground to a very fine particle size to allow dispersion of inhibitor components uniformly through the fish meat, such as surimi. Thus, when the surimi is mixed with salt, the myofibrillar proteins are solubilized and thereby open up the muscle fibers to make the inhibitor of the extract or of the potato product such as the freeze-dried raw potato powder, available to the proleolytic enzyme produced by the parasites.

The raw freeze-dried potato powder is particularly suitable for making surimi because it contains starch which is a common ingredient added to most surimi-based products.

The term "whole raw potato" as used herein includes "peeled potatoes". Peeled whole raw potatoes are preferred for use in this invention.

The freeze-dried raw potato powder is prepared by collecting freshly dug potatoes, preferably Norgold potatoes. The potatoes are peeled, diced, frozen, and then finely ground while still frozen in a suitable apparatus such as a meat grinder, into a fine snow-like product which is then freeze-dried. After drying, the product is preferably ball milled to a uniform, fine powder which is $-100$ mesh U.S. screen size.

Surimi made from fresh Pacific whiting which has been kept chilled and processed quickly (within 24-30) hours after catching) can be made into a high quality product by adding the extract or the freeze-dried raw potato powder ingredient to the surimi at the time of salt addition. The product made by this procedure will have gel properties capable of being used wherever pollock surimi is currently being used in finished products. It is white, firm, resilient and has excellent gel properties on heating.

The extract or the raw freeze-dried potato powder ingredient is used to make gelable surimi or other fish paste products by adding the extract or the freeze-dried raw potato powder to the fish at the time of salt addition or at the time of making surimi so that the fish can be kneaded while in the presence of the inhibitor and the salt. The salt is added in an amount to open up the muscle fiber during the kneading or mixing operation so that the proteolytic enzyme becomes exposed to the inhibitor which is present in the extract and the freeze-dried raw potato powder. The salt may be added to the fish paste or surimi and mixed therewith and then the inhibitor may be added (either in the form of the extract or the raw freeze-dried potato powder) followed by further mixing.

DETAILED DESCRIPTION OF THE INVENTION AND PREFERRED EMBODIMENTS

The raw freeze-dried potato powder is obtained by peeling, dicing and freezing the potatoes, grinding them in the frozen state and then freeze drying the ground frozen potatoes after which they are milled to a desirable particle size. The freeze-dried raw potato powder is preferably made by obtaining freshly dug Norgold potatoes such as those obtainable from Moses Lake, Washington State. The potatoes are peeled, diced, frozen and then ground while still frozen. A meat grinder may be used to grind the frozen potato to obtain a fine snow-like product. The frozen ground potato is then freeze-dried. After drying the product is ball milled to a uniform fine powder ($-100$ mesh U.S. screen).

The extract is also preferably obtained from freshly dug Norgold potatoes. The preferred extract is obtained by first peeling, dicing and immersing the diced potatoes in a Na-dithionite (7g/l) solution. The potatoes are kept immersed in the solution until the complete batch of potatoes is peeled and diced at which time the excess solution is decanted off. The potatoes are then ground to a fine size. This may be accomplished by blending the potatoes in a large blender such as a Waring blender, for two minutes with a small volume of Na-dithionite solution being added to make a slurry. This usually requires about 200 ml dithionite solution per one gallon blender jar of potato dices.

The extract can also be prepared from freshly dug potatoes which are first peeled, diced and frozen prior to extraction to preserve the inhibitor content. At the time of extraction, the frozen potatoes may be ground directly into a sodium dithionite solution to form a slurry when thawed. The extraction procedure can then proceed as with fresh un-frozen potatoes.

The slurry is pressed to separate the pulp from the extract. The extract is acidified with HCl to a pH of 4.3 or less, preferably 3.0. A precipitate forms after acidification and it is removed by any suitable method, such as centrifugation. The remaining supernatant is then brought to 70% $(NH_4)_2SO_4$ by slow addition of solid $(NH_4)_2SO_4$ to cause the formation of a $(NH_4)_2SO_4$ precipitated fraction. The precipitated fraction which forms is then removed and recovered. Next the precipitate fraction is washed with 70% $(NH_4)_2SO_4$ and then dissolved in distilled water to obtain a solution containing the 70% $(NH_4)_2SO_4$ precipitated fraction dissolved therein. The solution containing the 70% $(NH_4)_2SO_4$ precipitated fraction is then exhaustively dialyzed against distilled water using 1000 molecular weight cut-off dialysis membrane. After dialysis, the extract is frozen and then freeze-dried.

The freeze-dried extract may be added to the ground meat of contaminated fish along with salt so that the fish can be kneaded in the presence of the extract and salt. The salt is added in an amount to solubilize the myofibrillar proteins. The salt may be added in an amount which varies from 1.5-3.0%. Preferably 2.5-3.0% salt is used. The salt is added and kneading is performed to accomplish solubilization of the myofibrillar proteins. If one kneads for a longer period of time, less than 3% salt is sufficient. A longer kneading time may require less than 3% of salt to solubilize the protein. In a preferred embodiment, surimi from contaminated fish is mixed for five minutes with 3% salt (based upon the weight of the fish). Next, the freeze-dried Norgold potato extract is added, preferably in an amount of 0.3%. Then the fish, salt and extract are mixed for an additional fifteen minutes. The obtained product can then be further processed and cooked in accordance with conventional methods to produce a product which has a desirable gel strength and elastic property.

Throughout the specification, wherever the term "percentage" is used, it is to be understood that this term refers to "percentage by weight". Also, the amount of each ingredient added to the fish is (unless indicated otherwise) expressed in terms of percentage by weight with respect to the weight of the fish.

The raw, dried potato powder can be similarly used in place of the extract in the same process. When using the dried raw potato powder, the powder is preferably added to the fish in an amount of 3%.

When adding dried extract or raw dried potato powder to the fish, for testing purposes it is desirable to add an equal weight of water to maintain the moisture level of the fish product.

The same procedures may be followed by treating the meat of uncontaminated species of fish which are not necessarily subject to the softened condition. When treating the meat of uncontaminated fish, it is preferred to use the raw freeze-dried Norgold potato powder instead of the extract obtained from the same potatoes since the freeze-dried potato powder results in an unexpected improvement over the use of the extract when treating uncontaminated fish.

The following examples are given to further illustrate the preferred embodiments of the invention.

EXAMPLE I

Surimi was made from parasitized Pacific whiting caught off the Pacific coast on the U.S. and Canadian border, held on Champagne ice about 6-8 hours, processed into skin-on fillets, shipped to a laboratory in Seattle, packed in ice arriving twenty-four hours after they were caught. These fillets were immediately skinned, minced and processed into surimi. The surimi was frozen and held at $-29°$ C. until used.

Freshly dug Norgold potatoes were obtained from Moses Lake, Washington. They were peeled, diced, frozen and then ground while still frozen through a meat grinder into a fine snow-like product which was freeze-dried. After drying the product was ball-milled to a uniform fine powder ($-100$ mesh U.S. screen).

The frozen surimi was allowed to thaw overnight in a cold room at 2° C. The surimi was placed in a large ceramic mortar and mixed with 3% salt for five minutes by hand with a pestle. The raw freeze-dried potato powder was then added and mixing was continued for an additional fifteen minutes (twenty minutes total). The freeze-dried raw potato powder was added in an amount of 3%. An equal amount of ice water was added (3%) to maintain the moisture level. The mixture was then de-aerated in a vacuum-packaging machine, stuffed into casings, and cooked forty minutes at 90° C. in a water bath. After cooling in ice water, it was held overnight in a refrigerator. The next day it was brought to room temperature and gel-strength and fold tests were run. A control was prepared by mixing surimi with salt for twenty minutes. A third sample was prepared the same way using 0.3% of a freeze-dried extract of Norgold potatoes prepared in the following manner:

The potatoes were peeled, diced and immersed in Na-dithionite (7g/l) solution until the complete batch was peeled, then the excess dithionite solution was decanted off. The potatoes were then ground in a large Waring blender for two minutes with a small volume of the dithionite solution to make a slurry. The slurry was pressed through a Nylon filter sack and the pulp discarded. The extract was acidified to pH 3.0 with HCL and the precipitate removed by centrifugation. The supernatant from this step was brought to 70% $(H_4)_2SO_4$ by slow addition of solid $(NH_4)_2SO_4$.

The resultant precipitate occurring at 70% $(NH_4)_2SO_4$ concentration was recovered by centrifugation. This precipitate was then slurried with 70% $(NH_4)_2SO_4$ solution and collected on a bed of filter aid (Celite 545) about 3/16 inches thick in a Buchner funnel under vacuum. The precipitate was then dissolved in distilled water upon removal from the surface of the filter aid bed. Any residual celite remaining was removed by vacuum filtration on Whatman #1 filter paper in a Buchner funnel. The clear supernatant was then placed in 1000 molecular weight cut-off dialysis tubing and exhaustively dialyzed against distilled water to remove traces of $(NH_4)_2SO_4$. After dialysis, the extract was frozen in a thin sheet, then freeze dried.

Likewise an amount of ice water was added to the third sample in an amount equal to the amount of freeze dried extract (0.3%) to maintain the moisture level.

A summary of the kamaboko treatments and results are listed on Table 1.

It was noted that Samples 2 and 3 shown in Table 1 were comparable to top grade pollock surimi in functionality and thereby provide an economical solution to the problems associated with contaminated fish meat.

EXAMPLE II

Commercial RA grade frozen Alaska pollock surimi was thawed overnight in a cold room at 2° C. The surimi was placed in a large ceramic mortar and mixed by hand with a pestle. Salt was added to the surimi and mixed for five minutes. The surimi-salt mixture was used to prepare a sample containing Norgold freeze-dried potato extract and also a sample containing the Norgold freeze-dried potato powder. The sample containing the Norgold freeze-dried potato extract was prepared by adding 0.3% of the freeze-dried extract to the salted surimi and mixing for an additional fifteen minutes (twenty minutes total mixing time). Ice water was added at the same level as the freeze dried potato extract (0.3%) to maintain the moisture level of the fish. The freeze-dried Norgold potato powder sample was prepared by adding 3% of the freeze-dried Norgold potato powder to the salted surimi mixture and mixing it for an additional fifteen minutes (twenty minutes total). Likewise, ice water was added at the same level (3%) as the dry potato powder to maintain the moisture level. A control sample was prepared by mixing surimi with 3% salt for twenty minutes. No water was added to this sample. The potato extract and the potato powder used in Example II are the same as those described in Example I. After mixing, the samples were handled as described for the treatment of samples in Example I.

A summary of kamaboko treatments and results are listed in Table 2.

Example II demonstrates that the raw, unheated potato ingredient has a beneficial effect on the gel-forming properties of the Alaska pollock surimi. The fact that such a low level (0.3%) of the extract produces a significant increase in the gel-strength over the control illustrates that this is a function of the protein component of the potato and not of the starch. Sample No. 3 contains all of the components of the potato and shows a still greater effect.

The raw potato extract and the raw potato product are preferably used in dry form. When processing or drying the extract or the potato, care must be taken to keep the temperature under 80° C. because the effective components in the potato are heat labile (destroyed by excessive heat). Therefore, when processing or drying the extract or the potato, the temperature must be kept under 80° C. so that the effective or active component of the potato is not destroyed or denatured. This is illustrated by the data in Table 3 where, in the first case, the extract was heated prior to freeze drying and, in the second case, it was not. It is readily apparent that the heating step destroyed the active component.

Freeze drying is the preferred method of making the dried extract or the dried raw potato product since this method can be used to effectively dry the product without destroying or denaturing it. However, other known commercial drying methods may also be employed so long as they maintain the product temperature sufficiently low to prevent denaturization of the active component. These methods include spray drying, foam-mat drying and low temperature conveyor-type drying. Any of these conventional drying processes may be substituted for the freeze-drying method providing care is taken to prevent the extract or the potato product from being heated above 80° C.

It is also possible to use the raw ground potato which has not been dried. Thus, raw ground potato (either frozen or unfrozen) may be substituted for the extract or the dried potato product and may be added directly to the fish paste. The results of using raw ground potato are illustrated in Table 4.

Regardless of the form of the potato ingredient (e.g. extract, dried raw potato powder, raw ground potato), the potato ingredient may be added either at the surimi making stage added with other ingredients prior to mixing and freezing of surimi or the kamaboko stage (at the same time or before salt addition and kneading) prior to heating. Data showing the effectiveness of additives in surimi is presented in Table 5.

The effective ingredient in the potato or the extract thereof, is believed to be a protein. It will be appreciated that the concentration of the active ingredient in the dried extract will be higher than the concentration of the active ingredient in the dried potato powder. Likewise, the dried potato product will have a higher concentration of active ingredient than the raw ground potato. Therefore, different amounts of the various forms of the additives (i.e. extract, dried potato product or raw ground potato) will have to be added to the fish to obtain a fish product containing equivalent amounts of the active ingredient. For example, Table 6 illustrates that an effective amount of the freeze-dried potato extract (0.3%) provides 0.273% protein whereas it takes about 10 times the amount of freeze dried potato (3.0%) to provide about the same amount of protein. It will also be noted from Table 6 that addition of 0.3% dried extract provides 0.273% protein additive and, as shown in Tables 1 and 2, this small amount of protein provides excellent gel strength. Thus, the protein additive of the extract used in this invention is very effective in a small amount and can provide excellent gel-strength even when added in an amount of less than 0.3%. Likewise, the dried potato product is similarly very effective when added in amounts which provide less than 0.3% protein additive.

While the present invention has been described in terms of certain preferred embodiments and exemplified with respect thereto, one skilled in the art will readily appreciate that variations, modifications, changes, omissions and substitutions may be made without departing from the spirit thereof. It is intended, therefore, that the present invention be limited solely by the scope of the following claims.

TABLE 1

| Pacific whiting surimi samples | Additive | % Additive | % Water | % Salt | Gel Strength GM-CM | Fold test 3 MM |
|---|---|---|---|---|---|---|
| 1. | None (control) | — | — | 3% | 82 | D |
| 2. | Norgold potato extract | 0.3% | 0.3% | 3% | 746 | AA |
| 3. | Whole dried Norgold potato | 3% | 3% | 3% | 668 | AA |

TABLE 2

| AK pollock RA surimi Samples | Additive | % Additive | % Salt | % Water** | Gel Strength GM-CM | Fold test 3 MM |
|---|---|---|---|---|---|---|
| 1. | None (control) | — | 3% | — | 370 | A |
| 2. | Norgold potato extract | 0.3% | 3% | 0.3% | 556 | AA |
| 3. | Whole dried Norgold potato | 3% | 3% | 3% | 756 | AA |

TABLE 3

Effect of heating potato extract on gel strength of Kamaboko made from surimi derived from parasitized Pacific whiting muscle.

| Samples | Additive | % Additive | % Salt | % Water** | Gel Strength GM-CM | Fold test 3 MM |
|---|---|---|---|---|---|---|
| 1. | None (control) | — | 3 | — | 65.2 | D |
| 2. | Norgold potato extract (heated)* | 0.3 | 3 | 0.3 | 62.4 | D |
| 3. | Norgold potato extract (unheated) | 0.3 | 3 | 0.3 | 681.1 | AA |

*Extract heated to 80° C., the denatured protein removed by centrifugation, and the soluble supernatant freeze-dried and used as heated extract (heat-stable component).
**Added to balance solids addition from the dry additive.

TABLE 4

Effect of adding raw (undried peeled whole potato on gel strength of kamaboko made from surimi derived from parasitized Pacific whiting muscle.

| Samples | Additive | % Additive | % Salt | Gel Strength GM-CM | Fold test 3 MM |
|---|---|---|---|---|---|
| 1. | None (control) | — | 3 | 26.2 | D |
| 2. | Raw ground Russet Potato | 10* | 3 | 383 | AA |

*Whole ground raw potato contained 80% moisture so whole raw potato solids comprised only 2.0% on a surimi basis.

TABLE 5

Effect of adding freeze-dried whole Norgold potato ingredient to surimi prior to freezing on gel-strength of kamaboko (surimi derived from parasitized Pacific whiting muscle).

| Samples | Additive | % Additive | % Salt | % Water | Gel Strength (GM-CM) | Fold test 3 MM |
|---|---|---|---|---|---|---|
| 1. | None (control) | — | 3 | — | 33.8 | D |
| 2. | Freeze-dried whole Norgold potato | 3 | 3 | 3 | 498.1 | AA |

TABLE 6

Protein content of whole dried potato and dried potato extract along with the concentration of protein added to the surimi.

| Samples | Additive | % protein in additive | % additive in surimi | % additive protein added to surimi |
|---|---|---|---|---|
| 1. | Freeze-dried Norgold potato extract | 90.96 | 0.3 | 0.273 |
| 2. | Freeze-dried whole Norgold potato | 9.07 | 3 | 0.272 |

We claim:

1. A method for treating fish meat contaminiated with sporozoa which comprises:
   (i) grinding the sporozoa-contaminated fish to make a fish paste;
   (ii) adding salt and a protease inhibitor to the fish; and
   (iii) kneading the fish in the presence of the salt and the protease inhibitor; said protease inhibitor being a water extract of raw potato obtained by contacting raw potatoes with an aqueous sodium dithionite solution in an amount to prevent discoloration and grinding the potatoes while in contact with the sodium dithionite solution to form a slurry; pressing the slurry to obtain an aqueous extract; acidifying the extract to a pH no higher than 4.3 to form a precipitate and a supernatant; separating the precipitate from the supernatant; dissolving $(NH_4)_2SO_4$ in the supernatant in a sufficient amount to cause the formation of a $(NH_4)_2SO_4$ precipitated fraction therein; recovering the precipitated fraction; dissolving the precipitated fraction in distilled water to form a solution; dialyzing the solution against distilled water using 1000 molecular weight cut-off dialysis membrane, and collecting the dialyzed product which contains the protease inhibitor.

2. The method of claim 1 wherein the extract is added in an amount to provide less than 0.3% protease inhibitor.

3. The method of claim 1 which further comprises the step of drying the extract at a temperature of less than 80° C.

4. The method of claim 2 wherein the extract is freeze dried.

5. The method of claim 4 wherein the $(NH_4)_2SO_4$ precipitated fraction is formed by adding solid $(NH_4)_2SO_4$ to the supernatant in an amount to form a solution containing 70% $(NH_4)_2SO_4$.

6. The method of claim 5 wherein the aqueous extract is acidified to a pH of 3.0.

7. The method of claim 6 wherein the salt is added in an amount of 2.5–3.0% based upon the weight of the fish.

8. The method of claim 7 wherein the freeze-dried extract is added in an amount of 0.3% based upon the weight of the fish.

9. The method of claim 8 wherein the fish paste is surimi.

10. The method of claim 8 wherein the potatoes are Norgold potatoes.

11. A method of treating fish meat contaminated with sporozoa which comprises:
    (i) grinding the sporozoa-contaminated fishmeat to make a fish paste;
    (ii) adding salt and a protease inhibitor to the fish;
    (iii) kneading the fish in the presence of the salt and protease inhibitor; said protease inhibitor being added in the form of a powdered dried raw potato product obtained by grinding raw potatoes; drying the ground potatoes at a temperature of less than 80° C. and then milling the dried potatoes into a fine powder; said powder containing the protease inhibitor.

12. The method of claim 11 wherein the powder is added in an amount to provide less than 0.3% protease inhibitor.

13. The method of claim 11 wherein the potatoes are freeze dried.

14. The method of claim 13 wherein the freeze dried potatoes are ball milled to a mesh size of −100 U.S. screen.

15. The method of claim 14 wherein the salt is added in an amount of 2.5–3.0% based upon the weight of the fish.

16. The method of claim 15 wherein the freeze-dried potato powder is added to the fish paste in an amount of 3% based upon the weight of the fish.

17. The method of claim 16 wherein the potatoes are Norgold potatoes.

18. The method of claim 16 wherein the fish paste is surimi.

19. A method for improving the gel-strength of fish meat obtained from fish which are not contaminated with sporozoa, said method comprising the steps:
    (i) grinding the meat from fish which are not contaminated with sporozoa;
    (ii) adding salt and a protein containing raw potato extract to the fish; and
    (iii) kneading the fish in the presence of the salt and the extract; said extract being a water extract of raw potato obtained by contacting raw potatoes with an aqueous sodium dithionite solution in an amount to prevent discoloration and grinding the potatoes while in contact with the sodium dithionite solution to form a slurry; pressing the slurry to obtain an aqueous extract; acidifying the extract to a pH no higher than 4.3 to form a precipitate and a supernatant; separating the precipitate from the supernatant; dissolving $(NH_4)_2SO_4$ in the supernatant in a sufficient amount to cause the formation of a $(NH_4)_2SO_4$ precipitated fraction therein; recovering the precipitated fraction; dissolving the precipitated fraction in distilled water to form a solution; dialyzing the solution against distilled water using 1000 molecular weight cut-off dialysis membrane; and collecting the dialyzed product containing the protein.

20. The method of claim 19 wherein the extract is added in an amount to provide less than 0.3% protein.

21. The method of claim 19 which further comprises the step of drying the extract at a temperature of less than 80° C.

22. The method of claim 21 wherein the extract is freeze-dried.

23. The method of claim 22 wherein the $(NH_4)_2SO_4$ precipitated fraction is formed by adding solid $(NH_4)_2SO_4$ to the supernatant in an amount to form a solution containing 70% $(NH_4)_2SO_4$.

24. The method of claim 23 wherein the aqueous extract is acidified to a pH of 3.0.

25. The method of claim 24 wherein the salt is added in an amount of 2.5%–3.0% based upon the weight of the fish.

26. The method of claim 25 wherein the water is added to the fish paste in an amount equal to the amount of freeze-dried extract.

27. The method of claim 25 wherein the freeze-dried extract is added in an amount 0.3% based upon the weight of the fish.

28. The method of claim 27 wherein the fish paste is Alaska pollock surimi.

29. The method of claim 27 wherein the potatoes are Norgold potatoes.

30. A method for improving the gel-strength of fish meat obtained from fish which are not contaminated with sporozoa; said method comprising the steps of grinding the meat from fish which are not contaminated with sporozoa of the type which are capable of softening the meat; adding salt and a dried raw potato powder to the fish; and kneading the fish in the presence of the salt and the potato powder; said potato powder being a powdered dried raw potato product obtained by grinding raw potatoes; drying the ground potatoes at a temperature less 80° C. and then milling the dried potatoes into a fine powder.

31. The method of claim 30 wherein the powder is added in an amount to provide less than 0.3% protein.

32. The method of claim 30 wherein the potatoes are freeze-dried.

33. The method of claim 32 wherein the freeze-dried potatoes are ball milled to a mesh size of −100 U.S. screen.

34. The method of claim 33 wherein the salt is added in an amount of 2.5–3.0% based upon the weight of the fish.

35. The method of claim 34 wherein the freeze-dried potato powder is added to the fish paste in an amount of 3% based upon the weight of the fish.

36. The method of claim 35 wherein the potatoes are Norgold potatoes.

37. The method of claim 35 wherein the fish paste is Alaska pollock surimi.

38. An improved extract for treating fish meat; said extract formed by contacting raw potatoes with an aqueous sodium dithionite solution and grinding the potatoes while in contact with the sodium dithionite solution to form a slurry; pressing the slurry to obtain an aqueous extract; acidifying the extract to a pH no higher than 4.3 to form a precipitate and a supernatant; separating the precipitate from the supernatant; dissolving $(NH_4)_2SO_4$ in the supernatant in an amount to cause the formation of $(NH_4)_2SO_4$ precipitated fraction therein; recovering the precipitated fraction; dissolving the precipitated fraction in distilled water using 1000 molecular weight cut-off dialysis membrane; collecting and drying the dialyzed product at a temperature less than 80° C. said product being substantially free from discoloration.

39. The extract of claim 38 wherein the dialyzed product is freeze-dried.

40. The extract of claim 39 wherein the $(NH_4)_2SO_4$ precipitated fraction is formed by adding solid $(NH_4)_2SO_4$ to the supernatant in an amount to form a solution containing 70% $(NH_4)_2SO_4$.

41. The extract of claim 40 wherein the aqueous extract is acidified to a pH of 3.0.

42. A dried raw potato product in the form of a powder said product containing active protease inhibitor; said powder formed by grinding raw potato; drying the ground potatoes at a temperature less than 80° C. whereby said inhibitor remains active and then milling the dried potatoes into a fine powder.

43. The potato product of claim 42 wherein the potatoes are freeze-dried.

44. The potato product of claim 43 wherein the freeze-dried potatoes are ball milled to a mesh size of −100 U.S. screen.

45. A method of making a product for improving the gelation of fish meat said method comprising contacting raw potatoes with a sodium dithionite solution in an amount effective to prevent the potatoes from becoming discolored; grinding the potatoes while in contact with the sodium dithionite solution to form a potato slurry; pressing the slurry to obtain an aqueous extract; acidifying the extract to a pH no higher than 4.3 to form a precipitate and a supernatant; separating the precipitate from the supernatant; dissolving $(NH_4)_2SO_4$ precipitated fraction therein; recovering the precipitated fraction; dissolving the precipitated fraction in distilled water to form a solution; dialyzing the solution against distilled water using 1000 molecular weight cut-off dialysis membrane; collecting and drying the dialyzed product at a temperature less than 80° C.

46. The method of claim 45 wherein the dialyzed product is freeze-dried.

47. The method of claim 46 wherein the $(NH_4)_2SO_4$ precipitated fraction is formed by adding solid $(NH_4)_2SO_4$ to the supernatant in an amount to form a solution containing 70% $(NH_4)_2SO_4$.

48. The method of claim 47 wherein the aqueous extract is acidified to a pH of 3.0.

49. A method for making a product for improving the gelation of fish meat; said method comprising grinding raw potatoes; drying the ground potatoes at a temperature less than 80° C. and then milling the dried raw potatoes into a fine powder to form a dried raw potato product containing an active protease inhibitor.

50. The method of claim 49 wherein the potatoes are freeze-dried.

51. The method of claim 50 wherein the freeze-dried potatoes are ball milled to a mesh size −100 U.S. screen.

52. In a method for making frozen surimi with includes the steps of adding a protease inhibitor and a cryoprotectant to minced fish; forming the mixture into surimi and then freezing the surimi; wherein the improvement comprises adding the protease inhibitor of claim 38 to the fish at the time that the cryoprotectants are mixed with the fish.

53. In a method for making frozen surimi which includes the steps of adding a protease inhibitor and a cryoprotectant to minced fish; forming the mixture into surimi and then freezing the surimi; wherein the improvement comprises adding the protease inhibitor of claim 42 to the fish at the time that the cryoprotectant is mixed with the fish.

* * * * *